INVENTORS
WILTON WILLIAM WAVENEY DOWNING
KENNETH ROLAND ADAMS

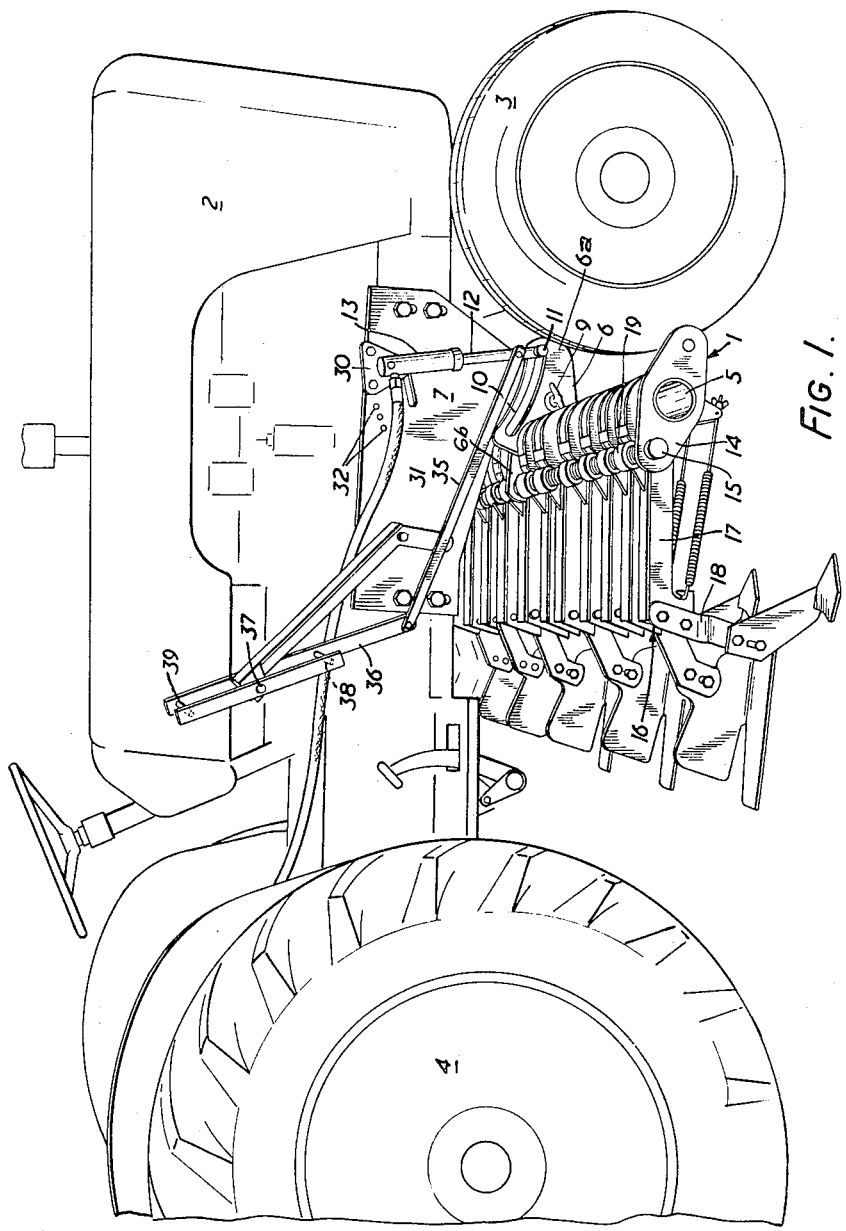

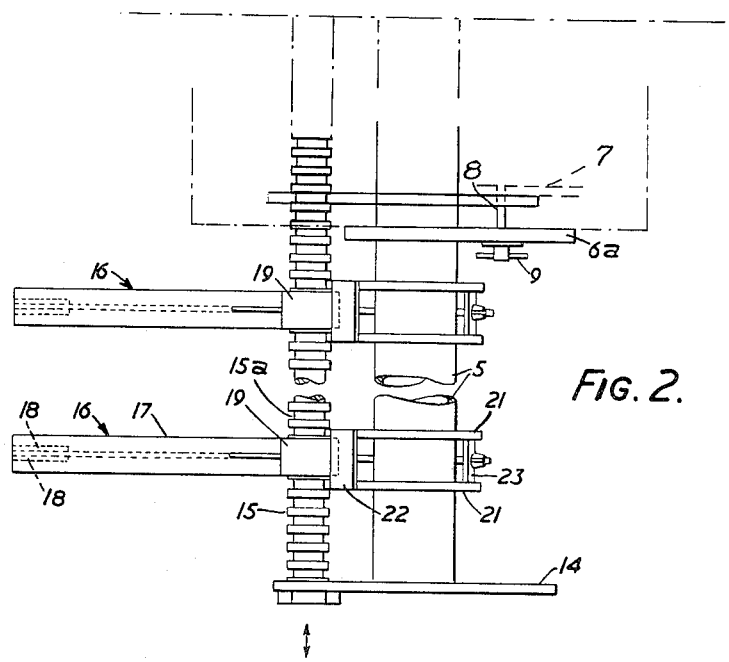
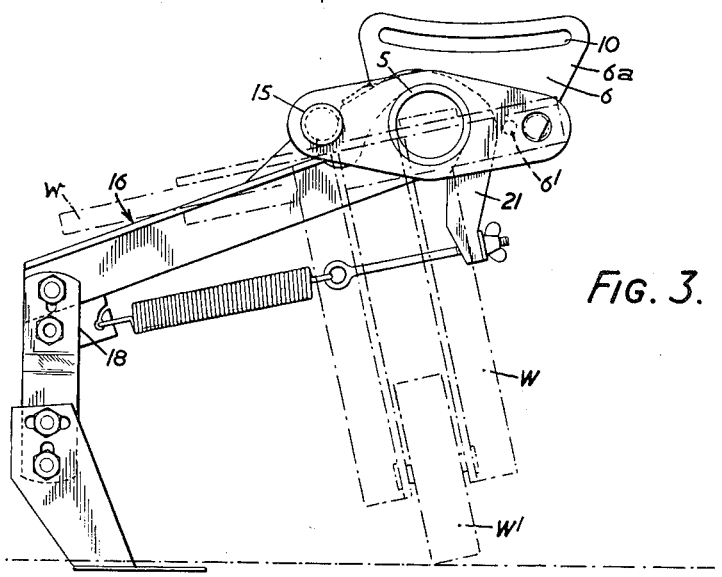

BY Hane and Nydick
ATTORNEYS

March 10, 1964 W. W. W. DOWNING ETAL 3,124,201
AGRICULTURAL IMPLEMENTS
Filed Nov. 7, 1962 7 Sheets-Sheet 4

INVENTORS
WILTON WILLIAM WAVENEY DOWNING
KENNETH ROLAND ADAMS
BY Hane and Nydick
ATTORNEYS March 10, 1964 W. W. W. DOWNING ETAL 3,124,201
AGRICULTURAL IMPLEMENTS
Filed Nov. 7, 1962 7 Sheets-Sheet 7

INVENTORS
WILTON WILLIAM WAVENEY DOWNING
KENNETH ROLAND ADAMS
By Hane and Nydick
ATTORNEYS

United States Patent Office 3,124,201
Patented Mar. 10, 1964

3,124,201
AGRICULTURAL IMPLEMENTS
Wilton William Waveney Downing, Uckington, near Cheltenham, and Kenneth Roland Adams, Ross-on-Wye, England, assignors to Gloster Equipment Limited, Gloucestershire, England, a company of Great Britain
Filed Nov. 7, 1962, Ser. No. 235,992
Claims priority, application Great Britain Nov. 8, 1961
17 Claims. (Cl. 172—303)

This invention is concerned with improvements in or relating to agricultural implements and it is an object of this invention to provide an improved implement support which can be mounted transverse to a tractor or like vehicle. Preferably the support is mounted beneath the tractor between the forward and rear ground engaging members, such as wheels, so as to bring tools on the support directly under the eye of the driver.

According to the present invention there is provided an implement support for mounting an implement upon a vehicle, the support comprising a support member, mounting means on the support for pivotally engaging the support with a support carrier supportable by the vehicle, a single acting jack, a means for securing one of the relatively movable parts movably to the vehicle and means for coupling the other relatively movable part to the support, and means for varying the direction of the line of action of the jack relative to the pivotal axis of the support when the support and jack are secured to the vehicle so that for one direction of the line of action operation of the jack will move the support in one direction about said axis and for another direction of the line of action operation of the jack will move the support in the opposite sense about said axis, thus providing for a full control of the position of the implement.

Such an implement support preferably comprises a member which when mounted extends transversely of the line of travel and the said axis is preferably spaced from the axis of the member. Furthermore the support preferably includes the means for coupling the jack part to the support, said means comprising a pin engaging that part of the jack or coupling to the support and a slot in the support, the slot being located relative to said axis so that the pin in one position corresponding to one line of action will move the support in one sense and in a second position correspondnig to another line of action will move the support in the opposite sense.

In a preferred form the angular position which the support will reach when moved in one sense by the jack will be variable to give a variable position of tools when supported thereby to enable, for example, depth control to be achieved. This can be effected by varying the line of action of the jack either by varying the jack position for the vehicle or the point at which the jack engages the support.

In order that the present invention may be well understood there will now be described some embodiments thereof given by way of example only, reference being had to the accompanying drawings in which:

FIGURE 1 is a perspective view of a tractor having an implement support mounted thereon;

FIGURE 2 is a plan view of the implement support removed from the tractor and to one side only of the centre line;

FIGURE 3 is a side elevation of the support removed from the tractor;

Figure 4:
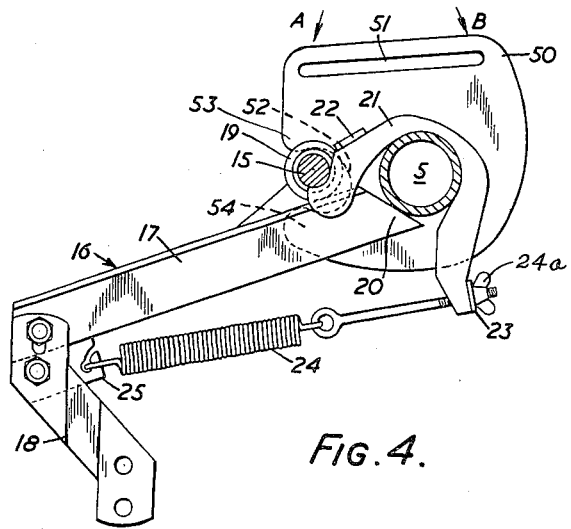
FIGURE 4 is a vertical section normal to the axis of the main beam of another embodiment of the support.

The implement support is indicated generally at 1 in FIGURE 1 and is shown mounted transversely of and beneath and below the tractor 2 so as to lie between the forward and rear ground engaging wheels 3, 4 where it is immediately under the eye of the driver.

The support comprises a main beam 5 having fast with it plates 6 each of which has an aperture 6' coaxial with the aperture of the other and which, when the support is mounted on the tractor, registers with a bushing on a plate 7 (FIGURE 1) secured to the tractor, and receives a hinge pin 8 (FIGURE 2). Each of these pins is provided with a head 9 for manual axial movement when coupling and uncoupling the support to the tractor.

One of the plates 6 is extended at 6a to form a coupling plate and includes a slot 10 with which when the support is mounted, a pin 11 engages which pin also engages the piston rod 12 of a single acting jack 13.

To the main beam 5 are secured plates 14 in which and in the plates 6 is received a pair of secondary axially aligned beams 15 having lands 15a, beams 15 meeting at the centre line of the tractor. On each secondary beam are located tool carriers 16 each of which comprises an arm 17 from which depends a tool post or plate 18, the arm being T-sectioned and having a boss 19 through which extends the secondary beam. The boss lies (best seen in FIGURE 4) spaced from the forward end 20 of the tool arm which normally abuts the under surface of the main beam. Locking each tool arm axially of the support are two hook like plates 21 coupled together by plates 22 and 23, the plates hooking over the main beam and under the secondary beam where each engages between lands 15a on the secondary beam to axially locate the boss of a tool arm 17. A spring 24 is anchored between the coupling plate 23 and a hook portion 25 fast with the tool arm to bias the tool arm clockwise as viewed in FIGURE 4. A wing nut 24a is provided to adjust spring tension. Each tool post 18 is bolted to a face of a tool arm and on each a tool stem may be secured, posts of various shapes being provided to variously position the tool heads.

To mount tool arms on the support the secondary beams which meet at the centre of the support are withdrawn outwardly through plates 6 and 14 and successive tool arm bosses are located on the secondary beams as these are returned to their operative position. The relative location of the tool posts will depend upon the spacing of the row crops, the state of the ground and the nature of the crops, and such location and selection will be readily determinable by one skilled in the art. Such location, however, can be effected through the length of the support. Where a plate 6 or 14 interferes with location of a boss, a pair of laterally angled posts is used to set the tool to one side of the tool arm. For forward or rearward location angled posts as shown in FIGURE 4 are used, set in the appropriate direction.

With the support is provided a pair of land wheel frames W one of which is attachable to each end of the support in the attitude shown in FIGURE 3. By lifting on handle tool w an operator can bring the tools off the ground and run the support under the tractor on the wheels W' and by further angular movement of the support can bring the apertures 6' in register with the apertures in the plates 7. Then the hinge pins 8 can be inserted into the aligned apertures. The jack piston rod is then coupled to the slot 10 by pin 11.

The jack 13 is pivotally mounted on a plate 30 having a bolt hole (not shown) registering with an arcuate slot 31 in plate 7 and bolt holes to register with bolt holes 32 in the plate 7. The slot 31 and holes 32 are located on arcs struck at different radii about the axis of pin 11 when at the right hand end of slot 10 with the support in a first position about the axis of hinge pins 8 where the tools are clear of the ground.

The jack plate 30 when located by bolts engaging any of the bolt holes 32 and the slot 31 will, on full jack stroke and with the pin in the forward end of the slot 10, always bring the support to the same attitude or same position. But for different positions of plate 30, and the pin 11 at the rear of slot 10 a full jack stroke will give varying angular movements from the first attitude. Thus different degrees of drive of the support from the first position or attitude to a second position or attitude where the tools engage the ground is obtainable, or in other words, drive of the tools into work is provided for various working depths.

Figure 7:
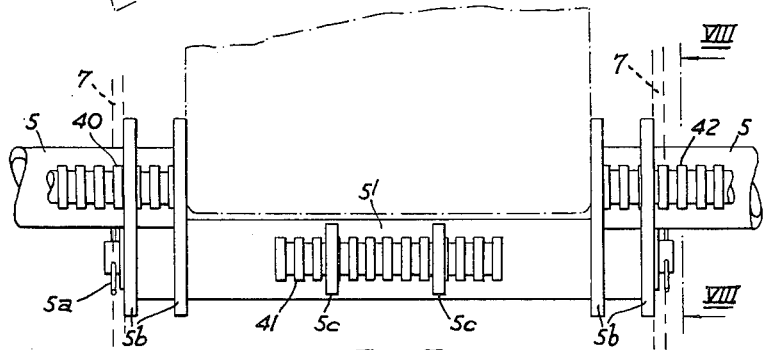
FIGURE 7 is a rear elevational view of a variation of the support.
Figure 8:
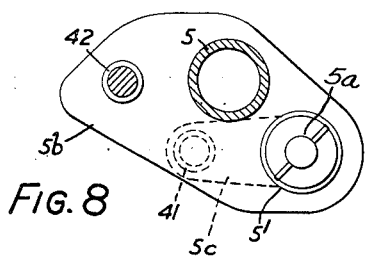
FIGURE 8 is a section on the line VIII—VIII of FIGURE 7.

To move the piston between the ends of slot 10 a rod 35 is provided coupled to a kick lever 36 pivoted at 37 and having foot stops 38, 39 for engagement by the driver to select either position of the piston relative to the slot.

Where the height of the tractor does not permit the beam to be run clear beneath the tractor, the beam may be cranked as shown in FIGURE 7 in which case three secondary beams 40, 41 and 42 are provided, the central part 5 of the main beam being below and slightly forward of the other parts of the main beam, the whole being pivotally mounted about the axis of the centre part of the beam by rods 5a which screw into the centre part of the beam to act as hinge pins. The outboard and centre parts of the beam are secured in parallel plates 5b which also receive the secondary beams 40, 42, the secondary beam 41 being held in plates 5c. When mounted the plates 5b lie inside the support plates secured to the tractor, sufficient clearance being left for the plates 5b to swing about the pivot axis. A tool carrier is held captive between each pair of plates 5b and if desired these captive carriers may be dropped below the outboard the secondary beam to clear projecting parts of the tractor, being then held by individual rods supported by plates 5b.

In an alternative arrangement the beam is pivoted about its own axis as can be seen in FIGURE 4 wherein there is again shown the main beam and a secondary beam, the main beam being carried by suitable bushes secured to the tractor. The coupling plate takes the form of a plate 50 having an aperture which receives the main beam, a slot 51 for receiving the jack connecting pin and a recess 52 which defines two jaws 53, 54. Rotation of the plate 50, by the jack acting along line A, anticlockwise as shown will move the tools into work by jaw 53 engaging the secondary beam, while clockwise rotation by the jack acting along line B will elevate the tools by engaging the underside of the secondary beam.

Figure 5:
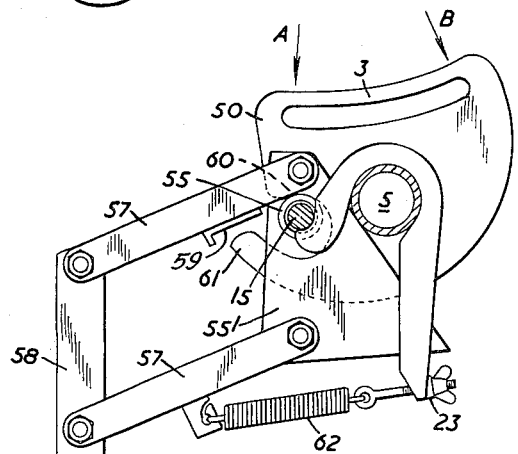
FIGURE 5 is a vertical section normal to the axis of the main beam of another embodiment of the support and showing the tool carrier of this embodiment and the embodiments of FIGURES 1 to 3.

Referring to FIGURE 5 the main beam 5 is mounted as in FIGURE 4 and with the secondary beams 15 again pivoted about the main beam axis. However the tool carriers each comprise a bush 55 in a plate 55' which carries parallel pivot link arms 57 pivotally anchored at the other end to a tool post 58 which will carry a tool. Beneath all of the upper arms 57 a lift bar 59 carried by arms, not shown, is pivoted to the secondary beams. The coupling plate 50 is recessed to define jaws 60 and 61, the upper jaw 60 acting to move the parts to position shown in full lines with the jack acting along line A and the lower jaw acting to lift the lift bar and hence the parallel link arms 57 and tool posts 58 out of work and then to pivot the main beam about its axis, the jack having acted along line B. Each pair of arms 57 is biased by a spring 62 coupled to the connector 23 of hook like plates 20, the tool carrier plates being thereby also biased to abut the main beam. The advantage of this construction is the maintenance of the attitude of the tools relative to the tool carrier plates and hence a substantially uniform attitude of the tools at whatever depth they are working.

Figure 6:
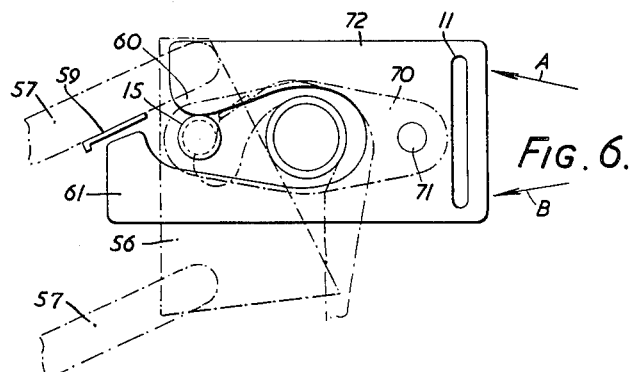
FIGURE 6 is a vertical section normal to the axis of the main beam of another embodiment.

In FIGURE 6 the main beam is provided with projections 70 which have apertures 71 for hinge pins such as 8 and the connection plate 72 also pivots on one hinge pin. Carrier plates 56 with parallel tool arms 57 are provided as in FIGURE 5 together with a lift bar 59. In this embodiment a jack acting along lines A and B by way of the slot 11, causes jaws 60 and 61 to act on the secondary beam and lift bar respectively as in the previous embodiment to drive the secondary beam about the hinge pin axis and to lift the upper arms, tools and secondary beam.

Clearly a similar arrangement of coupling plate hinging about an axis spaced from the main beam could be adopted in the embodiment of FIGURE 4.

A tool support as described is simple and robust, is easily and quickly mounted and dismounted from the tractor and provides adequate strength to maintain the tools in work without the whole support rocking about a horizonal axis parallel to the tractor centre line or a vertical axis intersecting that centre line. Any obstruction encountered by a tool in work will cause the tool arm or the parallel links to lift against the action of the respective biasing spring. Axial adjustment of the tools is simple requiring only the backing off of a wing nut, uncoupling of the hook like plates from between the lands of the secondary beam and the sliding of the tool carrier along that beam. Relocking is effected by re-engagement of the hook like plates and secondary beams and tightening of the tension spring by running up the wing nut.

Whilst a tubular main beam and rod section secondary beam have been shown other shaped sections may be adopted, provided that means are provided to allow the tools to yield on encountering an obstruction and while the hook like plates are shown engaging between lands on the secondary beam, other locking devices may be used, such as lock pins in the tool carrier bosses engaging the lands, or stops on the main beam to locate the hook like plates.

Figure 9:
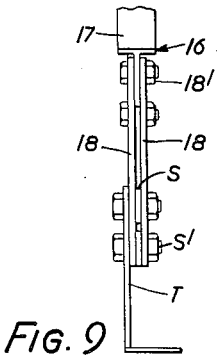
FIGURE 9 is an end elevation of one embodiment of the tool carrier.

The implement has been described with a single tool post, but as shown in FIGURE 9 a tool post may comprise two plates 18 bolted by bolts 18' to each face of the arm 17 and a spacer S held by bolts S' which hold the tool T, the heads being on that side adjacent the crop beside which the tool is to run.

Figure 10:
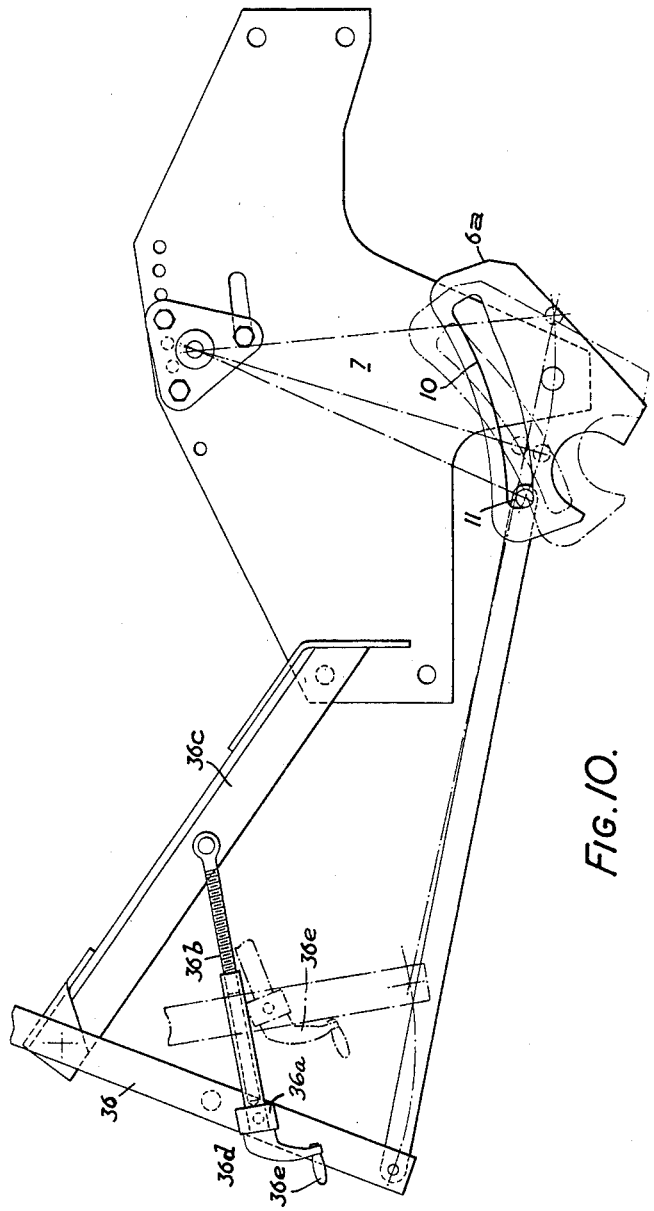
FIGURE 10 is a variation of the means for swinging the jack to vary the line of action.

Referring now to FIGURE 10, the jack, the plate and kick lever 36 are all as shown in FIGURE 1. However a swivel block 36a is mounted on the kick lever which block receives a telescopic rod 36b pivoted to the tie 36c and having an end stop 36d. The length of the rod 36b is adjustable by handle 36e. As will be seen, not only is the jack pivot axis adjustable but the end stop 36d will limit the position of the pin 11 according to the length of rod 36b and hence the throw of the support on operation of the jack.

Figure 11:
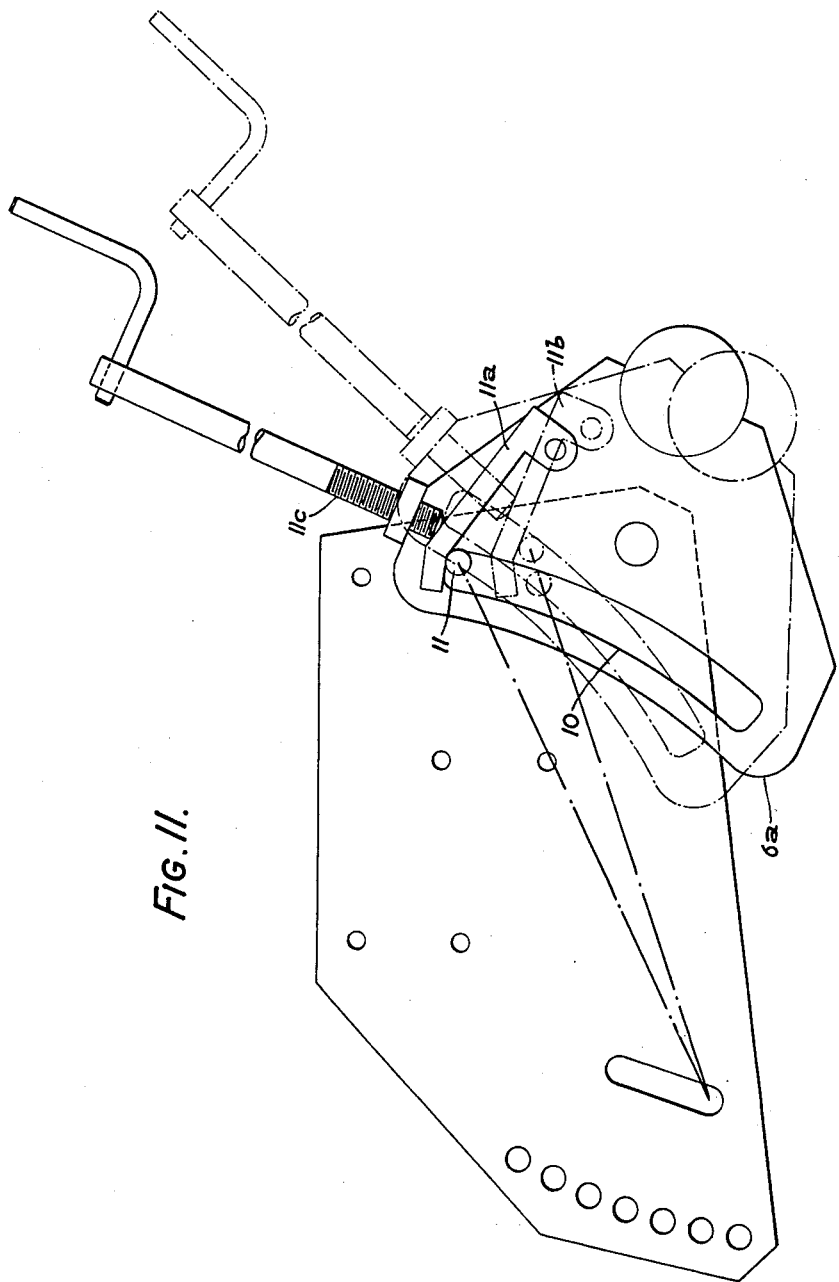
FIGURES 11, 12 and 13 are diagrammatic views of other embodiments of coupling plate on the support.

Referring to FIGURE 11, the plate extension 6a is shown for engagement by a jack mounted near horizontal, and the position of the pin 11 in FIGURE 11 is limited by an adjustable stop 11a pivoted at 11b and adjustable by threaded stop rod 11c.

Figure 12:
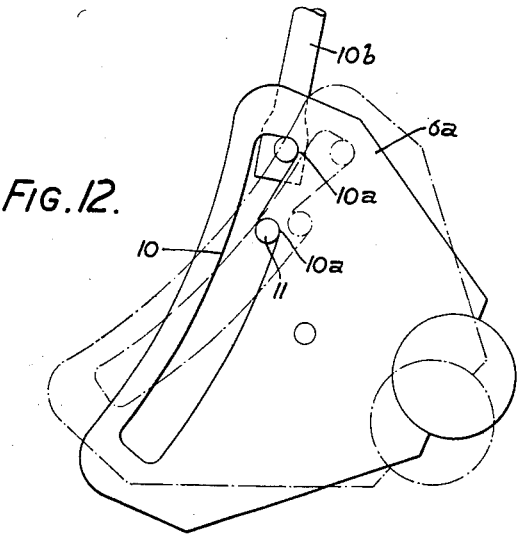

Referring to FIGURE 12 the slot 10 is provided with stop recesses 10a at different distances from the jack pivot axis which recesses will locate the pin at various settings and provide the same result. The jack will be positioned to engage the desired slot, when pressure is off, by a suitable lever 10b.

In each of FIGURES 10 to 12, the control for positioning the jack line of action is easily accessible to the driver who can obtain quick adjustment for various conditions met during a working run while the jack pivot adjustment is available if desired for meeting the general conditions likely to be met. Both adjustments may be provided on one of them only.

Figure 13:
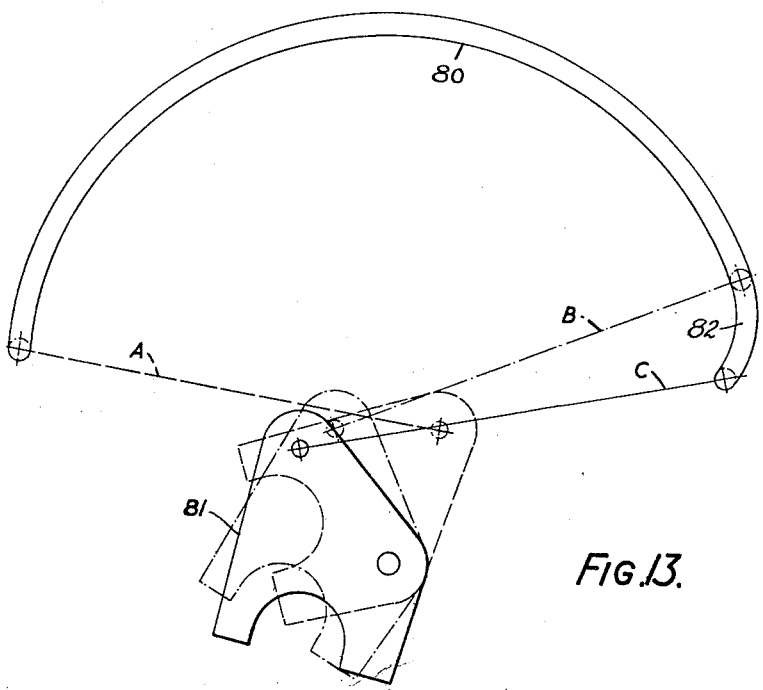

Referring to FIGURE 13 the line of action of the jack is adjustable, the jack engaging a slot 80 on the tractor and being pivotally coupled to the plate 81 fast with the beam which is pivoted about its own axis. The slot is of reduced radius at the part 82 whereby with the jack at A the support will always be rotated to a first position (out of work), with the jack at B the same throw but in the opposite sense is provided (first depth in work position) while with the jack at C an increased throw with greater effective movement is obtained (second depth in work positions). Increase of throw and effective movement can of course be provided by alternative arrangements. The jack would be movable by a control accessible to the driver.

We claim:

1. An implement support for mounting an implement upon a vehicle, the implement support comprising a support member, means pivotally engaging the support member with a support carrier supportable by the vehicle, a single acting jack, means securing one of the relatively movable parts of the jack movably to the vehicle, means coupling the other relatively movable part of the jack to the support member, and means for varying the direction of the line of action of the jack relative to the pivotal axis of the support member when the support member, support carrier and jack are secured to the vehicle so that for one direction of the line of action operation of the jack will move the support member in one direction about said axis and for another line of action of the jack operation of the jack will move the support member in the opposite sense about said axis.

2. An implement support for mounting an implement upon a vehicle, the implement support comprising a support member, a mounting member securable to the vehicle and pivotally engaging the support member, a single acting jack, means securing one of the relatively movable parts of the jack movably to the mounting member means coupling the other relatively movable part of the jack to the support member, and means for varying the direction of the line of action of the jack relative to the pivotal axis of the support member when the support member, support carrier and jack are secured to the vehicle so that for one direction of the line of action operation of the jack will move the support member in one direction about said axis and for another line of action of the jack operation of the jack will move the support member in the opposite sense about said axis.

3. An implement support for mounting an implement upon a vehicle, the implement support comprising a support member, means pivotally engaging the support member with a support carrier supportable by the vehicle, a single acting jack, means securing one of the relatively movable parts of the jack movably to the vehicle, means coupling the other relatively movable part of the jack to the support member, and means for varying the direction of the line of action of the jack relative to the pivotal axis of the support member when the support member, support carrier and jack are secured to the vehicle so that for one direction of the line of action operation of the jack will move the support member in one direction about said axis and for another line of action of the jack operation of the jack will move the support member in the opposite sense about said axis, the means for varying the line of action of the jack including means for pivotally coupling the jack part to the vehicle and a movable coupling between the other jack part and the support member, means being provided to adjust said movable coupling between said jack part and said support member relative to said pivotal axis.

4. An implement support according to claim 3 in which the movable coupling between said jack part and said support member comprises a pin engageable with said jack part and a slot in said support member.

5. An implement support for mounting an implement upon a vehicle, the support comprising an implement support member, means pivotally engaging the support member with a support carrier supportable by the vehicle, a single acting jack, means securing one of the relatively movable parts for the jack movably to the vehicle, means coupling the other relatively movable part of the jack to the support member, and means for varying the direction of the line of action of the jack relative to the pivotal axis of the support member when the support member, support carrier and jack are secured to the vehicle so that for one direction of the line of action operation of the jack will move the support member in one direction about said axis and for another line of action of the jack operation of the jack will move the support member in the opposite sense about said axis, means being provided to vary the position of one of said lines of action.

6. An implement support according to claim 5 in which said means for varying the position of one of said lines of action comprises a pin engageable with said jack part and a slot in said support member, and stop means against which the jack may bear in different angular attitudes about the jack pivot axis.

7. An implement support for mounting an implement upon a vehicle, the support comprising an implement support member, means pivotally engaging the support member with a support carrier supportable by the vehicle, a single acting jack, means securing one of the relatively movable parts of the jack movably to the vehicle, means coupling the other relatively movable part of the jack to the support member, and means for varying the direction of the line of action of the jack relative to the pivotal axis of the support member when the support member, support carrier and jack are secured to the vehicle so that for one direction of the line of action operation of the jack will move the support member in one direction about said axis and for another line of action of the jack operation of the jack will move the support member in the opposite sense about said axis, means being provided to vary the position of one of said lines of action, said means comprising a pin engageable with said jack part and a slot in said support member and adjustable stop means against which the jack may bear in different angular attitudes about the jack pivot axis.

8. An implement support according to claim 7 in which the stop means comprises a pivotal stop and a stop adjustment device.

9. An implement support according to claim 7 in which the stop means comprises a limit stop engageable by a jack displacement member.

10. An implement support according to claim 1 wherein said means securing said one jack part to the vehicle comprise a pivotal connection and the means coupling the other jack part to the support member comprise a movable coupling, the means for securing the jack part to the vehicle being adjustable to move the pivot axis of said jack part about a center coinciding with the means coupling said other jack part to the support member when said support member has been moved by the jack in one sense about the support pivot axis.

11. An implement support according to claim 10 wherein the means coupling the movable jack to the support member comprises a pin engageable with the respective jack part and a slot in the support member.

12. An implement support according to claim 1 and comprising means for varying the position of one of said lines of action to vary the position achieved by the support member upon operation of the jack, said means comprising an adjustable mounting means for securing the respective jack part to the vehicle and the coupling of the jack part to the support member being between a part fast with the support and said jack part.

13. An implement support according to claim 1 and comprising means for varying the position of one of said lines of action to vary the position achieved by the support member upon operation of the jack, said means including an adjustable mounting means for securing the respective jack part to the vehicle, and the coupling of the jack part to the support member being between a part movable relative to the support member and the jack part.

14. An implement support according to claim 1 in which the support member comprises a beam parallel to said support pivot axis, a pair of support members fast relative thereto, hinge pins axially movable to engage said support members, and hinge members forming the support carrier.

15. An implement support according to claim 1 wherein said support member includes a beam coaxial with said support pivot axis.

16. An implement support according to claim 1 wherein said support member comprises a main beam parallel with said support pivot axis, a secondary beam parallel to the main beam, and tool arms engageable with said secondary beam and pivotal about an axis parallel thereto.

17. An implement support according to claim 1 comprising means for varying the position of one of said lines of action to vary the position achieved by the support member upon operation of the jack, said means including an adjustable mounting of the jack to the vehicle and adjustable stop means defining a plurality of positions of one of the lines of action of the jack in each of said jack positions.

No references cited.